United States Patent Office 2,950,268
Patented Aug. 23, 1960

2,950,268

**PRODUCTION OF DICYANDIAMIDEFORMALDE-
HYDE REACTION PRODUCTS**

Anthony J. Cofrancesco, Albany, and Stiles M. Roberts, Loudonville, N.Y., assignors to General Aniline & Film Corporation, New York, N.Y., a corporation of Delaware No Drawing. Filed June 29, 1956, Ser. No. 594,698

8 Claims. (Cl. 260—69)

This invention relates to the production of improved reaction products of dicyandiamide and formaldehyde, and more particularly to an improved process for reacting dicyandiamide, formaldehyde and an ammonium salt, and to the product of such process.

The use of reaction products of formaldehyde and dicyandiamide for fixing soluble products on substrata is well known. More particularly, it is known that the wet fastness of dyeings and prints may be increased by aftertreatment with dicyandiamide-formaldehyde reaction products. Since such aftertreatments to improve the wet fastness of dyeings and prints is usually applied from an aqueous media, it is highly desirable that the aforesaid reaction products be sufficiently soluble in water to achieve the desired results. Many such reaction products have often had undesirable properties with respect to solubility, stability on storage and during treatment, and the like. In some cases, the shade of the treated dyeing or print is affected. In other cases, the wet fastness of the treated dyeings and prints, particularly leather dyeings and prints, have not been improved to the desired extent. Various other difficulties are known to have been encountered.

It has also been proposed to react dicyandiamide with formaldehyde in the presence of alkaline or acid catalysts and aqueous media. Thus, in U.S. Patent No. 2,741,535 there is disclosed the production of a reaction product from about 1.5 to 2.5 moles of formaldehyde and about 0.5 to 1 mole of a water-soluble easily ionizable ammonium salt of an inorganic or lower fatty acid per mole of dicyandiamide, by heating the aforesaid substances in aqueous media at temperatures of about 80 to 100° C. until the desired reaction product is obtained. While this reaction product has many highly desirable properties and applications, it has not been found to be completely satisfactory. More specifically, its stability in storage in the form of a concentrated aqueous solution, for example a 35% by weight solution, is not entirely satisfactory, there being a tendency to gel after a relatively short period of time. In addition, the use of such reaction product for the aftertreatment of certain types of dyeings and prints has been found not to yield the desired degree of improvement in wet fastness.

It is an object of this invention to eliminate or minimize the above-mentioned objection and disadvantages. Another object of this invention is the provision of an improved reaction product of dicyandiamide, an ammonium salt and formaldehyde. Still another object of this invention is the provision of an improved process for reacting dicyandiamide, formaldehyde and an ammonium salt to obtain an improved product. Other objects and advantages will appear as the description proceeds.

The attainment of the above objects is made possible by the instant invention which is based upon the discovery that a surprisingly improved reaction product is obtained when the above-mentioned process described in U.S. Patent No. 2,741,535 is carried out at a temperature below about 45° C. Stated otherwise, the instant invention includes a process comprising reacting from about 1 to 3 moles of formaldehyde, 0.5 to 1 mole of an ammonium salt of a strong acid and 1 mole of dicyandiamide in an acidic aqueous solution at a temperature below about 45° C., and the product or composition produced thereby. Concentrated aqueous solutions of the reaction products produced in accordance with the process of this invention have unexpectedly been found to have no tendency to gel and may accordingly be stored at temperatures even as high as 35 to 40° C. for at least 4 to 5 months without gelling or decomposing. The reaction products of this invention are sufficiently water soluble to enable the production of solutions having a concentration as high as 55 to 60 percent by weight, which solutions may be infinitely diluted with water without precipitating the reaction product. When the instant reaction products are employed for treating leather dyeings and prints, the improvement in wet fastness properties attained thereby is much greater than is attainable by use of similar reaction products produced at higher temperatures of 80 to 100° C. This is surprising in view of the relatively greater water solubility of the instant reaction products.

While any solution form of formaldehyde may be employed, it is preferred to employ commercially available aqueous solutions containing about 40% formaldehyde by volume. The water present in this solution is generally sufficient to dissolve the other two solid reactants, namely dicyandiamide and the ammonium salt. While larger quantities of water may be employed in forming the reaction medium, it is obviously desirable, economically and otherwise, to employ an amount of water only sufficient to dissolve the three essential reactants required in the instant process. Although the reactants may be mixed and/or dissolved in any order, it is generally preferred simply to dissolve the required amount of dicyandiamide and ammonium salt in the aqueous formaldehyde solution.

The preferred ammonium salt is ammonium chloride, but other ammonium salts of strong acids may be employed such as ammonium phosphate, ammonium bromide, ammonium sulfate and the like.

The reaction between the formaldehyde, dicyandiamide and ammonium salt is exothermic in nature and accordingly there is an immediate tendency for the temperature of the solution to rise. As stated above, the instant process involves carrying out the reaction at a temperature below about 45° C., which requires the application of cooling means. As a further feature of this invention, it has been found that even further improvements are obtained with respect to stability solubility, and/or wet fastness properties when the above-mentioned initial exothermic reaction is allowed to proceed until a maximum temperature is reached between about 70 to 90° C., and the solution then immediately cooled to a temperature below 45° C. and maintained at such temperature until the desired reaction product is obtained. The reaction is carried out under acidic conditions, the initial pH being between about 5.0 and 6.8. During the reaction, the pH gradually drops, the pH of the solution at the end of the reaction being about 2.5 to 3.0. This pH, however, rises upon storage in a relatively short period of time, usually about 2 hours, to 5.0 to 6.8. The temperature of the reaction is in general maintained below 45° C., down to about a lower limit of 10° C., and the duration of the reaction will be dependent upon the particular temperature employed, the concentrations of reactants and the like. Generally, the reaction is complete in from 2 to 20 hours, about 3 to 6 hours being usually sufficient.

As a result of the process of this invention, there is obtained a clear, colorless solution capable of infinite dilution with water. When the process is carried out in the preferred manner with a minimum of water, solutions are obtained with concentrations as high as 55 to 60% by weight, which solutions may if desired be diluted with water to a standard concentration, for example about 35%, for sale purposes. In actual use for improving wet fastness properties of dyeings and prints, the reaction products of the instant invention are generally applied from aqueous solutions in proportions of about 0.5 to 5% or more based on the weight of the material being treated. Such reaction products are substantive to the material and accordingly the material need only be rinsed and dried in normal manner following treatment therewith. The nature of the reaction taking place in the process of this invention is not definitely known, but it is believed that during the reaction the ammonium salt ionizes to liberate ammonium ion and acidic ion, the latter assisting in rendering the medium acidic and the former taking part in the reaction product. In any case, it has been proven that the ammonium radical reacts and becomes an integral part of the reaction product. The reaction product is soluble in water and dilute acid solutions, but precipitates at a pH above about 7 and can be regarded as an acidic reaction product.

The solutions produced by the process of this invention may if desired be dried under vacuum at low temperatures (e.g. room temperature) to yield a dry powder. This is not necessary, however, since as stated above, such solutions are stable and do not gel in storage, as distinct from similar reaction products produced at higher temperatures which gel and are hence immediately dried to a powder.

It has also been found that the reaction products of the instant invention may be employed to improve the affinity of materials for dyestuffs subsequently applied thereto. This is particularly true with respect to cellulosic fibrous material such as cotton and rayon which when treated with the instant reaction products may be subsequently dyed to obtain full depths of shade with less dyestuff and increased resistance to bleed off, migration, etc. during rinsing, washing and/or other wet aftertreatments. Care, however, must be taken to thoroughly rinse the material pretreated with the instant reaction products before dyeing since the presence of any appreciable quantity of reaction product in the pretreated material will precipitate the dyestuff in the dyebath.

The following examples, in which parts are by weight unless otherwise indicated are only illustrative of the instant invention and are not to be regarded as limitative.

*Example 1*

1.8 moles formaldehyde as a 40% by volume aqueous solution, 1 mole dicyandiamide and .53 moles ammonium chloride are mixed well, the temperature being kept below about 25° C. The charge is held at 15–20° C. for 4 hours. The product is a colorless liquid having a solids content of about 55%. A dilution of the above product with about 5–10 moles water yields a good wash-fastness improving product for treating textile and leather dyeings, although the dilution may vary over a wide range.

*Example 2*

1.8 moles formaldehyde as a 40% by volume aqueous solution, 1 mole dicyandiamide and .65 moles ammonium chloride are mixed well. The temperature rises to about 70–90° C., but is immediately cooled to below 40° C., and held at 35–40° C. for 4 hours. The product is a colorless liquid having a solids content of about 55%, and a pH of about 5.5 to 6.0 after about 2 hours. A dilution of the above product, with about 5–10 moles water yields a good wash-fastness improving product for treating textile and leather dyeings, although the dilution may vary over a wide range.

In the following examples, parts and proportions are by weight of the material being treated unless otherwise indicated.

*Example 3*

Approximately 100 g. suede sheepskin garment leather is wet back in sufficient water to cover the skin at 125° F. with 2% ammonium hydroxide and 1% Igepal CA 630 (General Aniline & Film Corp., nonionic alkylphenoxy polyoxyethylene ethanol wetting agent). It is rinsed well and refloated at 150° F.

The leather is dyed for 30 minutes in a dyebath of suitable dilution containing 5% Fastusol Brilliant Blue L8GU (Pr. 432) at 150° F. The dye is exhausted by addition of 3% formic acid. 7% Tanolin R, a trademarked basic chromium sulfate chrome-tanning compound, which has been dissolved in twice its weight of water together with 10% lactic acid (on the weight of the Tanolin R), is added and the dyeing run for 30 minutes at 150° F.

The product of Example 2 above is diluted with 8 moles of water, and 20% of the resulting solution is then added to the treating bath and the bath, at a pH of about 5.5, is run 30 minutes. 4% aluminum sulfate is then added and the treatment continued for 30 minutes. The skin is rinsed and dried.

A multifibered fabric is attached to a specimen of the treated leather. The sample is washed in a launder-O-meter in a ½% soap solution for 30 minutes at 120° F., rinsed, acidified slightly and air dried. Very little fading of the leather occurs as shown by practically no color change in washed as compared with nonwashed leather, and there is very little running into the multifibered fabric.

When the above procedure is repeated, but using a similar reaction product of dicyandiamide, formaldehyde and ammonium chloride reacted at about 85° C., there is considerable fading of the treated leather and staining of the multifibered fabric, sufficient to render the treated leather dyeing unacceptable.

*Example 4*

Mercerized cotton poplin is pretreated for 20 minutes at 180° to 200° F. at a fiber:liquor ratio of 1:3 in a laboratory jig containing 3% of the solution obtained by diluting the product of Example 2 above with 8 moles of water, 1% of acetic acid (28% conc.) and .25% of Igepal CO 633 (General Aniline & Film Corp., nonionic polyoxyethylenated alkyl phenol wetting agent). The bath is then dropped and the poplin washed thoroughly.

The pretreated poplin is then dyed in a dyebath containing 1.5% of Fastusol Turquoise Blue LGA (PR 278) and 30% Glauber's salt. The jig is run for a total of 30 minutes, the dyebath dropped, the dyed poplin rinsed two ends with cold water, the rinse bath dropped, and the dyeing finished two ends with 1.5% of the above described solution containing the product of Example 2 above.

The resulting dyeing is much deeper in shade and much more resistant to bleed off, fading, and migration in washing than a similar dyeing not treated with the instant reaction products. Similarly improved results are obtained with rayon, a 2% dyeing on spun rayon pretreated as above described exhausting about 90 to 95% to produce a deep shade of dyeing which does not bleed in rinsing. A similar dyeing applied directly to spun rayon yields only a pastel shade.

This invention has been disclosed with respect to certain preferred embodiments, and various modifications and variations thereof will become obvious to those skilled in the art. It is to be understood that such modifications and variations are to be included within the spirit and purview of this application and the scope of the appended claims.

We claim:
1. A process comprising from an acidic aqueous solu- tion having a pH of about 2.5–6.8 and containing as substantially the sole reactants from about 1 to 3 moles of formaldehyde, 0.5 to 1 mole of an ammonium salt of a strong acid and 1 mole of dicyandiamide, and maintaining said solution at a temperature of about 10° to 45° C. until a water soluble reaction product is obtained.

2. A process comprising from an acidic aqueous solution having a pH of about 2.5–6.8 and containing as substantially the sole reactants from about 1 to 3 moles of formaldehyde, 0.5 to 1 mole of an ammonium chloride and 1 mole of dicyandiamide, and maintaining said solution at a temperature of about 10° to 45° C. until a water soluble reaction product is obtained.

3. A process comprising forming an acidic aqueous solution, having a pH of about 2.5 to 6.8, containing as substantially the sole reactants from about 1 to 3 moles of formaldehyde, 0.5 to 1 mole of an ammonium salt of a strong acid and 1 mole of dicyandiamide, allowing the resulting exothermic reaction to proceed until a maximum temperature is reached between about 70 to 90° C., and then immediately cooling and maintaining the solution at a temperature of about 10° to 45° C. until a water soluble reaction product is obtained.

4. A process comprising forming an acidic aqueous solution, having a pH of about 2.5 to 6.8, containing as substantially the sole reactants from about 1 to 3 moles of formaldehyde, 0.5 to 1 mole of ammonium chloride, and 1 mole of dicyandiamide, allowing the resulting exothermic reaction to proceed until a maximum temperature is reached between about 70 to 90° C., and then immediately cooling and maintaining the solution at a temperature of about 10° to 45° C. until a water soluble reaction product is obtained.

5. A process comprising forming an acidic aqueous solution containing as substantially the sole reactants 1 mole of dicyandiamide, .53 mole of ammonium chloride and 1.8 moles of formaldehyde, and maintaining said solution at a pH of about 2.5 to 6.8 and a temperature of about 10° to 45° C. until a water-soluble reaction product is obtained.

6. A process comprising forming an acidic aqueous solution, having a pH of about 2.5 to 6.8, containing as substantially the sole reactants 1 mole of dicyandiamide, .65 moles of ammonium chloride and 1.8 moles of formaldehyde as a 40% by volume aqueous solution, allowing the resulting exothermic reaction to proceed until a maximum temperature is reached between about 70 to 90° C., and then immediately cooling and maintaining the solution at a temperature of about 10° to 45° C. until a water-soluble reaction product is obtained.

7. A product produced in accordance with the process of claim 1.

8. A product produced in accordance with the process of claim 3.

References Cited in the file of this patent

UNITED STATES PATENTS

| | | |
|---|---|---|
| 2,214,067 | Petersen | Sept. 10, 1940 |
| 2,440,988 | Treboux et al. | May 4, 1948 |
| 2,662,071 | Elod | Dec. 8, 1953 |
| 2,741,535 | Streck | Apr. 10, 1956 |
| 2,768,055 | Streck et al. | Oct. 23, 1956 |
| 2,774,749 | Stanley et al. | Dec. 18, 1956 |